US006949299B2

(12) United States Patent
Roche et al.

(10) Patent No.: US 6,949,299 B2
(45) Date of Patent: Sep. 27, 2005

(54) SPRAY FORMED ARTICLES MADE OF BORON STEEL

(75) Inventors: Allen Dennis Roche, Saline, MI (US); David Robert Collins, Saline, MI (US); Richard L. Allor, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/710,202

(22) Filed: Jun. 25, 2004

(65) Prior Publication Data

US 2004/0219383 A1 Nov. 4, 2004

Related U.S. Application Data

(62) Division of application No. 10/248,643, filed on Feb. 4, 2003, now Pat. No. 6,810,939.

(51) Int. Cl.[7] .......................... B22F 9/02; C22C 38/14; C22C 38/00

(52) U.S. Cl. ....................... 428/546; 428/550; 428/551; 428/565; 428/587; 428/684; 164/46

(58) Field of Search ................................ 428/546, 550, 428/551, 565, 587, 684; 164/46

(56) References Cited

U.S. PATENT DOCUMENTS 4,044,217 A * 8/1977 Otsuki et al. ............ 219/78.11
4,956,025 A * 9/1990 Koyama et al. ............ 148/534
5,294,462 A 3/1994 Kaiser et al.
5,658,506 A 8/1997 White et al.
5,837,326 A * 11/1998 Dallaire et al. ............. 427/449
5,958,521 A * 9/1999 Zaluzec et al. ............. 427/449
5,967,218 A 10/1999 Pergande et al.
6,155,330 A * 12/2000 Kinane et al. ................ 164/19
6,159,554 A 12/2000 Kloft et al.
6,257,309 B1 * 7/2001 Kinane et al. ................ 164/46
6,258,185 B1 * 7/2001 Branagan et al. ........... 148/525
6,276,431 B1 8/2001 Grinberg et al.
6,470,954 B2 * 10/2002 Kinane et al. .............. 427/449
6,671,943 B1 * 1/2004 Mori et al. ................ 29/527.2

* cited by examiner

*Primary Examiner*—Stephen Stein
*Assistant Examiner*—Jason L. Savage
(74) *Attorney, Agent, or Firm*—Brooks Kushman, P.C.; Damian Porcari

(57) ABSTRACT

The present invention relates to a method of spray forming a boron steel metal article, and to the formed article. In at least one embodiment, the method comprises (a) providing a spray forming pattern, (b) spraying metallic particles onto the spray forming pattern, and (c) allowing the sprayed metallic particles to cool to form a metal article. In at least one embodiment, the metallic particles are sprayed from a carbon steel feedstock having a boron content of 0.25–2.25 weight percent, based on the total weight of the feedstock.

18 Claims, 2 Drawing Sheets

SPRAY FORMED ARTICLES MADE OF BORON STEEL

CROSS REFERENCE TO RELATED APPLICATIONS

This application is a divisional of U.S. application Ser. No. 10/248,643 filed Feb. 4, 2003, and issued as U.S. Pat. No. 6,810,939 on Nov. 2, 2004, entitled SPRAY FORMED ARTICLES MADE OF BORON STEEL AND METHOD OF MAKING THE SAME, the disclosure of which is hereby incorporated by reference.

BACKGROUND OF INVENTION

1. Field of the Invention

The present invention relates to spray formed articles made of boron steel, and methods for making the same.

2. Background Art

It is known to make spray formed articles such as a spray formed tool. A particularly common spray forming technique involves thermally spraying steel particles onto a spray forming pattern, allowing the steel particles to cool to form a desired article, and separating the article from the spray forming pattern. The steel particles being thermally sprayed onto the spray forming pattern are typically sprayed from carbon steel feedstock having a carbon content of 0.7–1.0% by weight, based on the weight of the feedstock.

While the use of carbon steel feedstock having a carbon content of 0.7–1.0% by weight typically results in metal articles which have relatively good surface and structural characteristics, the resulting articles can also have relatively high levels of oxides, typically on the order of about 25% by volume. The resulting articles can also have relatively high porosity. Tensile strength, weldability, and fracture toughness are believed to be inversely related to the level of oxides and porosity.

Most spray formed metal articles made in accordance with conventional techniques and materials typically have tensile strengths on the order of about 20–25 kpsi and an average Rockwell C micro-hardness of about 40. Metal articles with these properties are typically suitable for many prototype stamping and tool forming applications. However, there are commercially significant other applications that articles with these properties, because of the relatively low strength, are not typically suitable for use with. For instance, plastic injection molding tools are typically required to have tensile strengths above about 30 kpsi.

Accordingly, it is desirable, and there is a need, to provide spray formed articles and a method for making the same that provides an improvement over the prior art.

SUMMARY OF INVENTION

At least one aspect of the present invention relates to a method of spray forming a boron steel article. The method comprises providing a spray forming pattern, spraying metallic particles of boron steel onto the spray forming pattern, and cooling the metallic particles to form an article made of boron steel on the spray forming pattern. In this embodiment, the particles of boron steel are sprayed from a carbon steel feedstock comprising 0.25–2.25 weight percent boron, based on the total weight of the carbon steel feedstock.

In another aspect of the present invention, the metallic particles are sprayed from a carbon steel feedstock have a boron content of 0.25–1.25 weight percent, based on the total weight of the feedstock, and a titanium content of 0.50–2.0 weight percent, based on the total weight of the feedstock.

In yet another aspect of the present invention, the present invention pertains to a method of spray forming a metal article comprises providing a spray forming pattern, spraying metallic particles onto the spray forming pattern and allowing the sprayed metallic particles to cool to form a metal article having an average Rockwell C micro-hardness of greater than 45.

The present invention also relates to articles made of boron steel. The articles may be formed by the methods described herein.

DETAILED DESCRIPTION

Figure 1:
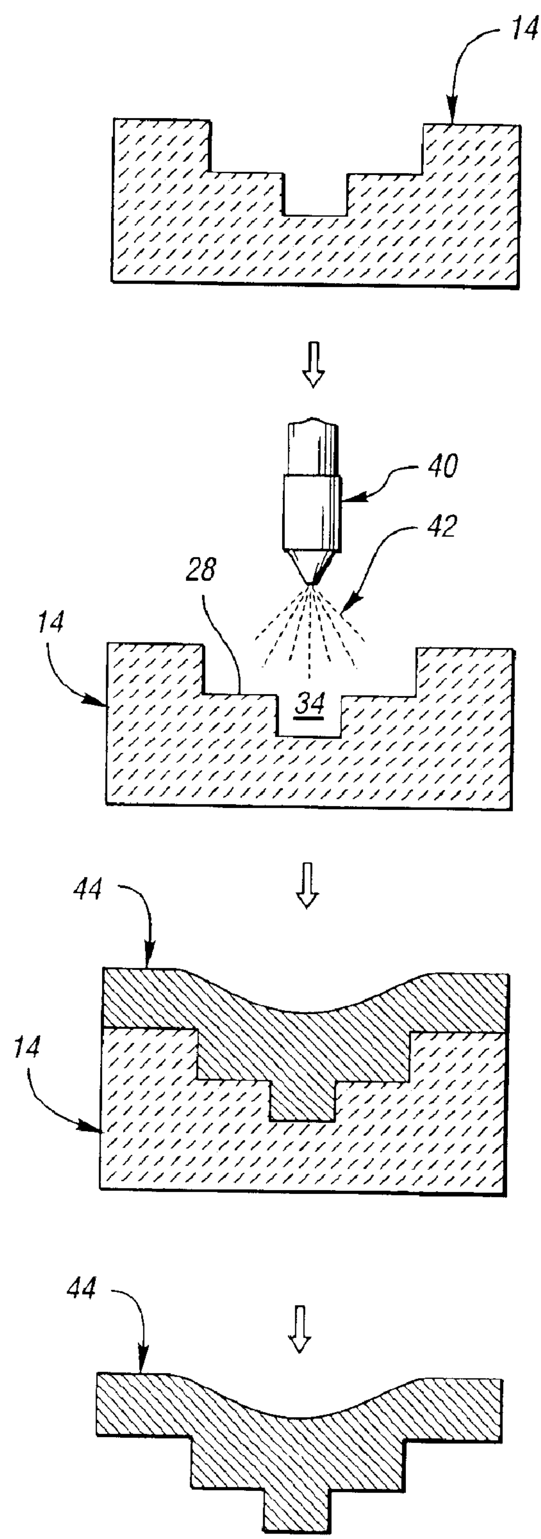
FIG. 1 is a schematic flow diagram of the processing steps of the present invention.

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description indicating amounts of material are to be understood as modified by the word "about" in describing the broadest scope of the invention. Practice within the numerical limits stated is generally preferred. Also, unless expressly stated to the contrary: percent, "parts of", and ratio values are by weight, and the description of a group or class of materials as suitable or preferred for a given purpose in connection with the invention implies that mixtures of any two or more of the members of the group or class are equally suitable or preferred.

The present invention relates to a process of forming boron steel metal deposits or articles 44. The process comprises providing a spray forming pattern 14 and spraying boron steel metallic particles 42 onto the spray forming pattern 14.

The sprayed metallic particles 42 are then allowed to cool to form a steel metal deposit or article 44. The article 44 is a steel article containing at least carbon and boron. In another embodiment, the metal article 44 is a steel article containing at least carbon, boron and titanium. In yet another embodiment, the metal article 44 is a steel article containing at least carbon, boron, titanium and manganese. The articles 44 could also contain other components, such as those typically found in sprayed metal articles. Examples of these components include, but are not necessarily limited to, phosphorous, sulfur, silicon, oxides and nitrites.

In at least one embodiment, the metal article 44 of the present invention has a tensile strength of 26,000–45,000 psi, a porosity of 0.5–10.0%, an oxide level of 7–20%, and an average Rockwell C micro-hardness of 45–65.

In another embodiment, the metal article 44 of the present invention has a tensile strength of 28,000–40,000 psi, a porosity of 0.5–3.0%, an oxide level of 10–18%, and a average Rockwell C micro-hardness of 45–60.

In yet another embodiment, the metal article of the present invention has a tensile strength of 30,000–37,000 psi, a porosity of 0.5–2.5%, an oxide level of 12–15%, and an average Rockwell C micro-hardness of 50–55.

To achieve a steel deposit 44 having the desired characteristics, the sprayed metallic particles 42 must originate from a sprayable material (i.e., feedstock), such as wire electrodes, containing at least carbon and boron. If used, the electrodes can be in any suitable configuration, and in one embodiment are cored wires.

In at least one embodiment, the sprayable material has a carbon content of 0.6–1.0 weight percent and a boron content of 0.25–2.25 weight percent, based on the total weight of the sprayable material. Typically deposited carbon steel sprayed from a carbon steel feedstock (i.e., sprayable material) having a boron content of greater than 2.25 weight percent, based on the total weight of the feedstock, may produce spray formed deposits that will delaminate from the ceramic substrate.

In another embodiment, the sprayable material has a carbon content of 0.7–0.95 weight percent and a boron content of 0.4–1.25 weight percent, based on the total weight of the sprayable material.

In yet another embodiment, the sprayable material has a carbon content of 0.75–0.9 weight percent and a boron content of 0.5–0.8 weight percent, based on the total weight of the sprayable material.

In other embodiments, the sprayed metallic particles 42 originate from a sprayable material containing carbon, boron, and titanium. In at least one embodiment, the sprayable material has a carbon content of 0.6–1.0 weight percent, a boron content of 0.25–2.25 weight percent, and a titanium content of 0.5–2.0 weight percent, based on the total weight of the sprayable material.

In another embodiment, the sprayable material has a carbon content of 0.7–0.95 weight percent, a boron content of 0.4–1.25 weight percent, and a titanium content of 0.75–1.5 weight percent, based on the total weight of the sprayable material.

In yet another embodiment, the sprayable material has a carbon content of 0.75–0.9 weight percent, a boron content of 0.5–0.8 weight percent, and a titanium content of 0.8–1.0 weight percent, based on the total weight of the sprayable material.

In certain embodiments, the sprayable material has a carbon content in an amount of 0.6–1.0 weight percent, a boron content in an amount of 0.25–2.25 weight percent, a titanium content in an amount of 0.5–2.0 weight percent, and manganese content in an amount of 0.25–2.0 weight percent, based on the total weight of the sprayable material.

In other embodiments, the sprayable material has a carbon content in an amount of 0.7–0.95 weight percent, a boron content in an amount of 0.4–1.25 weight percent, a titanium content in an amount of 0.75–1.5 weight percent, and a manganese content in an amount of 0.2–1.0 weight percent, based on the total weight of the sprayable material.

In yet another embodiment, the sprayable material has a carbon content in an amount of 0.75–0.9 weight percent, a boron content in an amount of 0.5–0.8 weight percent, a titanium content in an amount of 0.8–1.0 weight percent, and a manganese content in an amount of 0.5–0.75 weight percent, based on the total weight of the sprayable material.

Since the sprayable material of the present invention are steel-based materials, it should be understood that all of the sprayable materials discussed herein predominately contain iron, and possibly minor amounts of other common steel components, such as silicon, phosphorus and sulfur as the balance of their compositions.

The table below identifies several suitable sprayable material compositions in accordance with the present invention, with the weight percent ranges being based on total weight of the sprayable material:

| Component | Wt. % Range | Wt. % Range | Wt. % Range | Wt. % |
|---|---|---|---|---|
| Carbon | 0.6–1.0 | 0.7–0.95 | 0.75–0.9 | 0.8 |
| Boron | 0.25–2.25 | 0.4–1.25 | 0.5–0.8 | 0.6 |
| Titanium | 0–2.0 | 0.50–1.5 | 0.8–1.0 | 0.85 |
| Manganese | 0–2.0 | 0.4–1.0 | 0.5–0.75 | 0.7 |
| Silicon | 0–1.0 | 0.01–0.5 | 0.05–0.25 | 0.1 |
| Phosphorus | 0–1.0 | 0.005–0.25 | 0.01–0.1 | 0.04 |
| Sulfur | 0–1.0 | 0.005–0.20 | 0.01–0.1 | 0.03 |
| Iron | Balance | Balance | Balance | Balance |

As shown in FIG. 1, step (a) of the present invention involves providing a spray forming pattern 14. The spray forming pattern 14 can be formed of any suitable material and can be formed by any suitable manner. Examples of suitable materials include ceramics and metals. Examples of suitable spray forming techniques and materials can be found in U.S. Pat. Nos. 6,276,431, 5,967,218 and 5,658,506.

Figure 2:
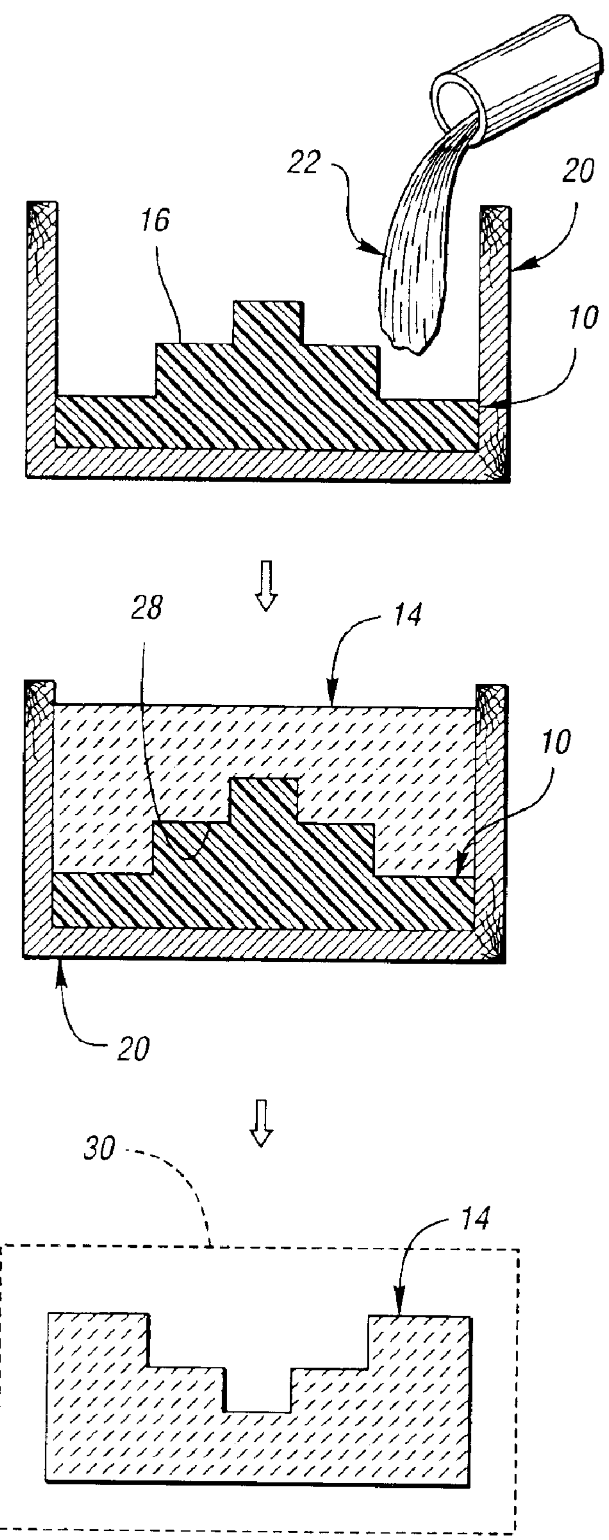
FIG. 2 is a schematic flow diagram of processing steps for forming a component usable with the present invention.

One suitable method of providing a spray forming pattern 14, as shown in FIG. 2, involves casting and solidifying a relatively low thermally conductive material, such as ceramic, about a master pattern 10 to form a ceramic spray forming pattern 14. The master pattern 10, shown schematically, has an upper surface 16 having a desired shape or contour. In one embodiment, the master pattern 10 is preferably polymeric and may be created using known solid-free form fabrication techniques controlled by a CAD/CAM model or other suitable methods known in the art.

Free-formed fabrication can comprise stereolithography, cubital, laminated or foam object manufacturing, 3-D printing and stratified extrusion. In certain embodiments, stereolithography is preferred because it creates a plastic pattern directly from a vat of liquid photo curable polymer through selective solidification using a scanner laser beam. The master pattern 10 could also be milled, or otherwise formed, out of wood, metal, laminate materials, renboard, etc.

One suitable method for casting the spray forming pattern 14 comprises placing the master pattern 10 in an open box 20. A liquefied ceramic slurry 22 is then poured into the box 20 about the master pattern 10. The ceramic slurry 22, after it solidifies, forms the spray forming pattern 14 which has a periphery, or outer surface 28, which closely resembles the inverse of the outer surface 16 of the master pattern 10, such that the spray forming pattern 14 forms a negative of the master pattern 10. The spray forming pattern 14 is then removed from the box 20. In the casting step above, a release agent, such as silicone or a wax, is preferably applied to the upper surface 16 of the master pattern 10 and the box 20 to help facilitate the removal of the spray forming pattern 14 from the box 20 and the master pattern 10.

After the separated, non-fired ceramic spray forming pattern 14 is removed from the box 20, it is then preferably heated in oven 30 to (i) drive off any remaining liquid in the ceramic, and (ii) further densify the ceramic. The temperature at which the spray forming pattern is heated is preferably about 600° C.

The ceramic spray forming pattern 14 is then removed from the heating oven 30 for use as a metal spray forming receptor. The outer surface 28 (FIG. 1) defines a cavity 34 having the general shape of the master pattern 10 such that the spray forming pattern 14 is a negative of master pattern 10.

After the spray forming pattern 14 is provided, metallic particles are then sprayed onto the spray forming pattern using spray forming. It should be understood that spray forming can refer to any technique used to deposit metal particles upon a substrate, i.e., thermal spraying, and cold spraying. Spray forming techniques that can be used in accordance with the present invention include, but are not limited to, spray-rolling, spray-forging, centrifugal spray-casting, spray-casting, spray-peening, splat-coating, particle composite deposition, roller atomizing, modified arc spray, and modified plasma-spraying.

In at least one embodiment, one or more thermal spray gun(s) 40, shown schematically in FIG. 1, are preferably utilized to spray metallic particles 42 onto the spray forming pattern 14 and, in this embodiment, into the cavity 34. The thermal spray guns 40 may be of the oxy-acetylene flame type in which a wire or powder metal is fed thereinto, a plasma into which powder metal is fed, or preferably one or two wire arc type, in which the tip of the wires is fed into the arc. Thermal spray guns are typically operated at about 30 volts and utilize gas, such as nitrogen, air, or mixtures thereof, to effect the atomization of the wire droplets. Cold spraying guns could be used in place of thermal spray guns to spray metallic particles onto the spray forming pattern 14. In addition, high-energy plasma-spraying, vacuum plasma-spraying, detonation, and high-velocity oxyfuel techniques can be utilized.

In a two wire arc spray gun, an electric arc is generated in a zone between two consumable wire electrodes. As the electrodes melt, the arc is maintained by continuously feeding the electrodes into the arc zone. The metal at the electrode tips is atomized by a blast of generally cold compressed gas. The atomized metal is then propelled by the gas jet to a substrate forming a deposit thereon.

In a single wire arc apparatus, a single wire is fed either through the central axis of the torch or is fed at an acute angle into a plasma stream that is generated internally within the torch. The single wire acts as a consumable electrode that is fed into the arc chamber. The arc is established between the cathode of the plasma torch and the single wire as an anode, thereby melting the tip of the wire. Gas is fed into the arc chamber, coaxially to the cathode, where it is expanded by the electric arc to cause a highly heated gas stream (carrying metal droplets from the electrode tip) to flow through the nozzle. A further higher temperature gas flow may be used to shroud or surround the spray of molten metal so that droplets are subjected to further atomization and acceleration.

Yet still other wire arc torch guns may be utilized that use a transferred-arc plasma whereby an initial arc is struck between a cathode and a nozzle surrounding the cathode; the plasma created from such arc is transferred to a secondary anode (outside the gun nozzle) in the form of a single or double wire feedstock causing melting of the tip of such wire feedstock.

The boron steel sprayable material is preferably in the form of a sprayable wire. The wire can be made by any suitable process. One suitable process comprises forming a cored wire, wherein boron powder is added in the center of a carbon steel sheath or tube such that the steel sheath is disposed outside of, or around, the boron center. The boron steel could also be provided in powder or melt form.

The deposited metal, by way of the heat received from the heated ceramic spray forming pattern 14, remains at a temperature which is sufficient to ensure that sufficient phase transformation occurs to offset detrimental shrinkage and solidification stresses. This temperature, in certain embodiments, is between 250–450° C., in another embodiment, is between 300–400° C., and in yet other embodiments is 350° C. The temperature of the spray forming pattern 14 may be maintained at the desired temperature by additionally heating the pattern separate from the oven 30 so that the temperature may be sustained for one to two hours, if necessary during the spray forming step. The temperature may also be controlled by changing spray parameters such as current, voltage, spray distance, spray gas and spray pressure of the gun 40.

After the spraying step, the deposited bulk material 44 and the spray forming pattern 14 are allowed to cool, preferably, for reasons of economy, by air to room temperature, preferably over a period of about two hours (i.e., 100° C./hour). The deposit 44 is separated from the spray forming pattern 14 by any suitable means and preferably, if the spray forming pattern 14 is ceramic, by cutting or chiseling the ceramic away from the article 44. To insure that all of the ceramic is removed, the deposit 44 may then be bead blasted. The resulting separated deposit 44 is essentially an exact negative of the pattern 14, or an essentially exact replica of the master 10 and then can be used as a die or mold part, or other suitable part, accordingly. It should be understood that the metal deposit 44 could be used for any other suitable purpose such as a finished article.

The following non-limiting example illustrates the present invention.

EXAMPLE

A ceramic spray pattern was thermally sprayed with a wire comprising about 0.5 wt. percent boron, about 0.8 wt. percent carbon, about 1.0 wt. percent titanium, and about 0.4 wt. percent manganese. The ceramic spray pattern was heated to a temperature of about 250° C. prior to initiation of the thermal spraying. The surface temperature of the ceramic spraying pattern was maintained at least at about 350° C. during spraying. Thermal spraying was stopped after about 200 passes, which gave a part thickness of about 0.5 inches. No peeling or warpage of the resulting part was noticed. The average Rockwell C micro-hardness of the resulting part was measured to be about 50. The resulting part had a tensile strength of about 32,000 psi.

Comparative Example 1

A ceramic spray pattern was thermally sprayed with a wire comprising about 6.0 wt. percent boron, about 0.8 wt. percent carbon, and about 0.4 wt. percent manganese. The ceramic spray pattern was heated to a temperature of about 250° C. prior to initiation of the thermal spraying. The surface temperature of the ceramic spraying pattern was maintained at least at about 350° C. during spraying. Thermal spraying was stopped after about 25 passes, which gave a part thickness of about 0.05 inches. Significant warpage of the resulting part was noticed. Because of the warpage and thinness of the resulting part, the average Rockwell C micro-hardness and tensile strength of the resulting part could not be measured.

Comparative Example 2

A ceramic spray pattern was thermally sprayed with a wire comprising about 0.75 wt. percent boron, and about 0.8 wt. percent carbon, and about 0.4 wt. percent manganese. The ceramic spray pattern was heated to a temperature of about 250° C. prior to initiation of the thermal spraying. The surface temperature of the ceramic spraying pattern was maintained at least at about 350° C. during spraying. Thermal spraying was stopped after about 200 passes, which gave a part thickness of about 0.5 inches. Significant warpage of the resulting part was noticed. The average Rockwell C micro-hardness of the resulting part was measured to be about 50. The resulting part had a tensile strength of about 38,000 psi.

While the best modes for carrying out the invention have been described in detail, those familiar with the art to which this invention relates will recognize various alternative designs and embodiments for practicing the invention as defined by the following claims.

What is claimed is:

1. A spray formed article comprising:

an independent metallic article comprising steel, carbon, boron, and titanium wherein the boron is present in the metallic article in an amount of 0.25 to 2.25 weight percent and the titanium is present in the metallic article in an amount of 0.5 to 2.0 weight percent.

2. A spray formed article made by:

(a) providing a spray forming pattern;

(b) spraying metallic particles onto the spray forming pattern, the metallic particles being sprayed from a carbon steel feedstock having a boron content of at least 0.25 weight percent, based on the total weight of the feedstock, and a titanium content of at least 0.5 weight percent, based on the total weight of the feedstock;

(c) allowing the sprayed metallic particles to cool to form the metallic article; and (d) removing the metallic article from the spray forming pattern.

3. The spray formed article of claim 2 wherein the carbon steel feedstock has a carbon content of 0.6 to 1.0 weight percent, based on the total weight of the feedstock.

4. The spray formed article of claim 3 wherein the carbon steel feedstock has a boron content of 0.25 to 2.25 weight percent, based on the total weight of the feedstock.

5. The spray formed article of claim 4 wherein the carbon steel feedstock has a titanium content of 0.5 to 2.0 weight percent, based on the total weight of the feedstock.

6. The spray formed article of claim 5 wherein the carbon steel feedstock has a boron content of 0.5 to 1.5 weight percent, based on the total weight of the feedstock.

7. The spray formed article of claim 5 wherein the carbon steel feedstock has a titanium content of 0.5 to 1.5 weight percent, based on the total weight of the feedstock.

8. The spray formed article of claim 5 wherein the carbon steel feedstock has a titanium content of 0.8 to 1.0 weight percent, based on the total weight of the feedstock.

9. The spray formed article of claim 5 wherein the carbon steel feedstock has a titanium content of 0.7 to 0.95 weight percent, based on the total weight of the feedstock.

10. The spray formed article of claim 2 wherein the metallic article has an average Rockwell C micro-hardness of at least 45.

11. The spray formed article of claim 2 wherein the metallic article has an average Rockwell C micro-hardness of 45–65.

12. The spray formed article of claim 2 wherein the metallic article has a tensile strength of 26,000–45,000 psi.

13. The spray formed article of claim 2 wherein the metallic article has a porosity of 0.5–10%.

14. The spray formed article of claim 2 wherein the metallic article has an oxide level of 7–20%.

15. The spray formed article of claim 2 wherein the steel contains at least 89.75 percent iron by weight.

16. The spray formed article of claim 2 wherein the metallic article has a portion that is at least 0.5 inches in thickness.

17. The spray formed article of claim 2 further comprising (d) removing the metal article from the spray forming pattern.

18. An independent spray formed article made by:

(a) providing a spray forming pattern;

(b) spraying metallic particles onto the spray forming pattern, the metallic particles being sprayed from a carbon steel feedstock having a boron content of at least 0.25 weight percent, based on the total weight of the feedstock, and a titanium content of at least 0.5 weight percent, based on the total weight of the feedstock; and (c) allowing the sprayed metallic particles to cool to form the independent metallic article.

* * * * *